United States Patent [19]

Tanimura

[11] 4,021,857
[45] May 3, 1977

[54] MAGNETIC RECORDING SYSTEM FOR REPRODUCING SUCCESSIVE STILL PICTURES

[76] Inventor: Hirozo Tanimura, 168, Hishiyanishi, Higashi-Osaka, Japan

[22] Filed: July 15, 1975

[21] Appl. No.: 596,013

[30] Foreign Application Priority Data

July 17, 1974 Japan .............................. 49-82360

[52] U.S. Cl. .................................. 360/84; 360/10; 360/64; 360/73

[51] Int. Cl.² ..................... H04N 5/78; G11B 5/52; G11B 5/78; G11B 15/52

[58] Field of Search .............. 360/84, 10, 64, 8, 71, 360/73, 35; 178/6, 6.7 R

[56] References Cited

UNITED STATES PATENTS

| | | | |
|---|---|---|---|
| 3,197,575 | 7/1965 | Eckstein | 360/84 |
| 3,294,902 | 12/1966 | Maxey | 360/10 |
| 3,454,713 | 7/1969 | Yanagimachi et al. | 360/10 |
| 3,813,484 | 5/1974 | Mino et al. | 360/10 |
| 3,838,451 | 9/1974 | Mino | 360/10 |
| 3,909,512 | 9/1975 | Omori | 360/10 |
| 3,942,188 | 3/1976 | Tanabe et al. | 360/10 |

Primary Examiner—Alfred H. Eddleman
Attorney, Agent, or Firm—Stevens, Davis, Miller & Mosher

[57] ABSTRACT

A magnetic recording system comprising a rotary magnetic head drum assembly including a plurality of rotary magnetic heads, a magnetic tape drive means for moving a magnetic tape passed round said rotary magnetic head drum assembly in a predetermined direction at a predetermined speed, and a means for controlling the rotational speed of the rotary magnetic heads in recording by utilizing the sync signals in the video signals reproduced from the rotary magnetic heads and a reference signal.

A video signal to be recorded is recorded by one of the rotary magnetic heads on the magnetic tape driven at a constant speed one field after another in the lengthwise direction of the tape. Also, the corresponding audio signal is recorded in a track parallel to the video signal record track.

11 Claims, 10 Drawing Figures

MAGNETIC RECORDING SYSTEM FOR REPRODUCING SUCCESSIVE STILL PICTURES

This invention relates to magnetic recording systems using rotary magnetic heads for recording a video signal on magnetic tape.

An object of the invention is to provide a magnetic recording system, which permits the obtaining of a number of successive still pictures reproduced at a predetermined interval of time (for instance 3.6 seconds) from a magnetic tape.

Another object of the invention is to provide a magnetic recording system, which permits reproduction of a number of still pictures together with simultaneous audio signals corresponding to each still picture from a magnetic tape.

A further object of the invention is to provide a magnetic recording system, which permits still picture reproduction free from cessation or a blank a period (i.e., period of absence of any reproduced picture) between two consecutive still picture reproduced.

Still another object of the invention is to provide a magnetic recording system, which permits the recording of a video signal on a magnetic tape as successive video signal record tracks of the same length and each covering one field of a unique content.

A still further object of the invention is to provide a magnetic recording system, which permits ready adjustment of the relation between the position of recording of a video signal on the tape and the position of recording of the corresponding audio signal.

Next, the effects produced by the invention will be particularly pointed out. Video signal may be recorded field by field on a magnetic tape in the lengthwise direction thereof, and also it is possible to record and/or reproduce an audio signal corresponding to video information for each field (Note: The term "and/or" is used in the sense that audio signal may be previously recorded alone on a magnetic tape for recording a corresponding video signal later while reproducing it, or it may be recorded simultaneously with the corresponding video). Also, the invention permits recording a video signal as successive fields in respective track portions of a fixed length, each being continuous to the preceding one. Further, it is possible to readily adjust the positional relation between video and audio signals to be recorded on a magnetic tape.

The above and further objects and novel features of the invention will become more fully apparent from the following detailed description when the same is read in connection with the accompanying drawings. It is to be expressly understood, however, that the drawings are given for the purpose of illustration only and not intended as a definition of the limits of the invention.

Figure 3:
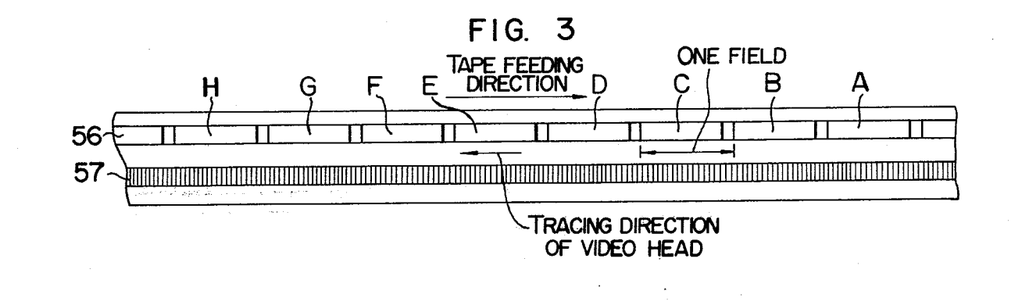
FIG. 3 is a view showing an example of a record track pattern produced on a magnetic tape in accordance with the invention.

While the invention is described hereinunder in connection with an example using three rotary magnetic heads, with reference to the accompanying drawings, a method of reproducing still pictures each together with relevant sound from a magnetic tape having a magnetic track pattern as shown in FIG. 3 will first be discussed in order to facilitate the understanding of the invention, which is based on a method of recording signals on the afore-said tape.

Figure 1:
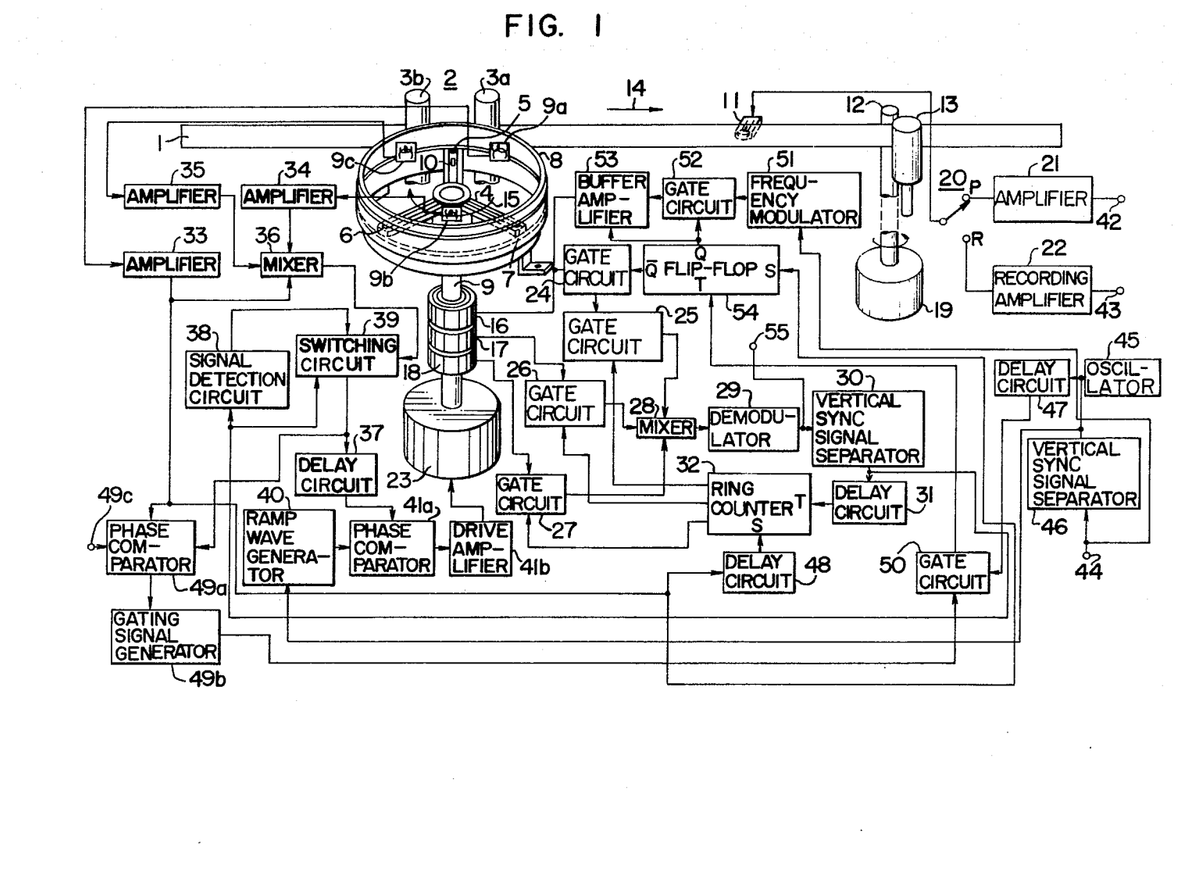
FIG. 1 is a block form representation of an example of the essential part of the magnetic recording system according to the invention.
Figure 2:
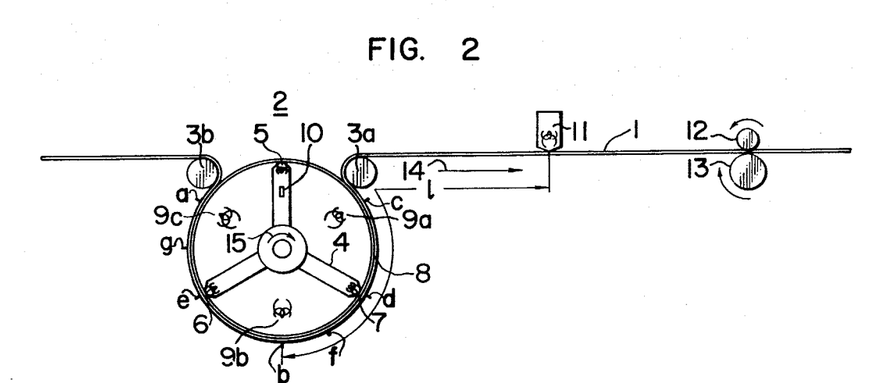
FIG. 2 is a top view of the rotary magnetic head drum assembly in the system of FIG. 1.

Referring now to FIGS. 1 and 2, a magnetic tape 1 is driven at a constant speed in the direction of arrow 14 by a capstan 12 (driven by motor 19) and a pinch roller 13. The tape 1 is adapted to proceed past a rotary magnetic head drum assembly 2 for reproducing video signal and a stationary magnetic head 11 for recording and reproducing audio signal. The tape 1 has a record pattern as shown in FIG. 3, with a video signal recorded in track 56 and an audio signal in track 57. With the progress of the tape 1, the audio signal recorded in the track 57 is reproduced by the magnetic head 11 and amplified by an amplifier 21 as shown in FIG. 1, and corresponding sound may be produced from a loudspeaker (not shown) connected to an output terminal 42.

The rotary magnetic head drum assembly 2 includes three rotary magnetic heads 5, 6 and 7, which are uniformly spaced apart (at an angular spacing of 120° and adapted to trace the video signal track 56 for reproducing the video signal. The tape 1 is passed around at least two-third of the periphery of the drum 8 of the rotary magnetic head drum assembly 2, and it is guided past the drum in a fashion of the character Ω.

In the video signal track 56 of the tape 1, video signals of different contents are recorded one field after another, as shown at A, B, C, . . . in FIG. 3. The track length of the record of each field is fixed and equal to the peripheral length of the drum 8 between adjacent ones of the rotary magnetic heads 5, 6 and 7. This means that a length of tape for at least two fields is wound on the drum 8.

The individual rotary magnetic heads 5, 6 and 7 are carried by respective arms 4, which extend from a shaft 9 of the motor 23 and are rotated by the motor 23 in the direction of arrow 15. Thus, in this system the rotary magnetic heads 5, 6 and 7 are rotated in the direction opposite to the direction of progress of the tape 1. Assuming, for instance, the speed of the motor 23 to be 20 rps and the track length for one field recorded in the video signal track of tape 1 to be 167 mm, the peripheral length of the drum 8 being in this case 167 × 3 ÷ 500 mm, the peripheral speed of the individual rotary magnetic heads 5, 6 and 7 is about 10 m/sec. While video signals in the Japan and United States standard television system usually include signals of about 0 to 4 MHz, as high a peripheral speed as mentioned above is practically sufficient to reproduce these signals.

As the tape 1 is driven at a constant speed in the direction of arrow 14 as mentioned earlier, the consecutive fields A, B, C, . . . as shown in FIG. 3 successively proceed around the drum. However, since a tape run for at least two fields always prevails on the drum 8, there must always be one complete field subjected to scanning by the successive rotary magnetic heads 5, 6 and 7. While the reproducible complete field moves on with the progress of the tape 1, by the time a complete field begins to leave the drum the next field is found thereon as a complete field for reproduction. Thus, still pictures are successively reproduced by the rotary magnetic heads 5, 6 and 7. (A still picture results from repeated reproduction of the same field several times.)

Assuming now that the tape 1 is driven at a speed of 47.5 mm/sec., the period of presence of one complete field on the drum is $167/47.5 = 3.6$ seconds, that is, the same field can be repeatedly reproduced for 3.6 seconds.

Now, an instant when a still picture is switched over the next one, for instance an instant of switching of a picture of field B over to that of field C in FIG. 3, is considered. At this moment, the record track portions of both the fields B and C are wholly found on the periphery of the drum 8 for reproduction as complete field. At this time, one of the magnetic heads, for instance magnetic head 5, may be adapted to effect the last reproduction of the field B and the first reproduction of the next field C, followed by repeated reproductions of the field C by the succeeding magnetic heads. By so doing, two consecutive still pictures may be switched without any intervening cessation period.

Figure 4:
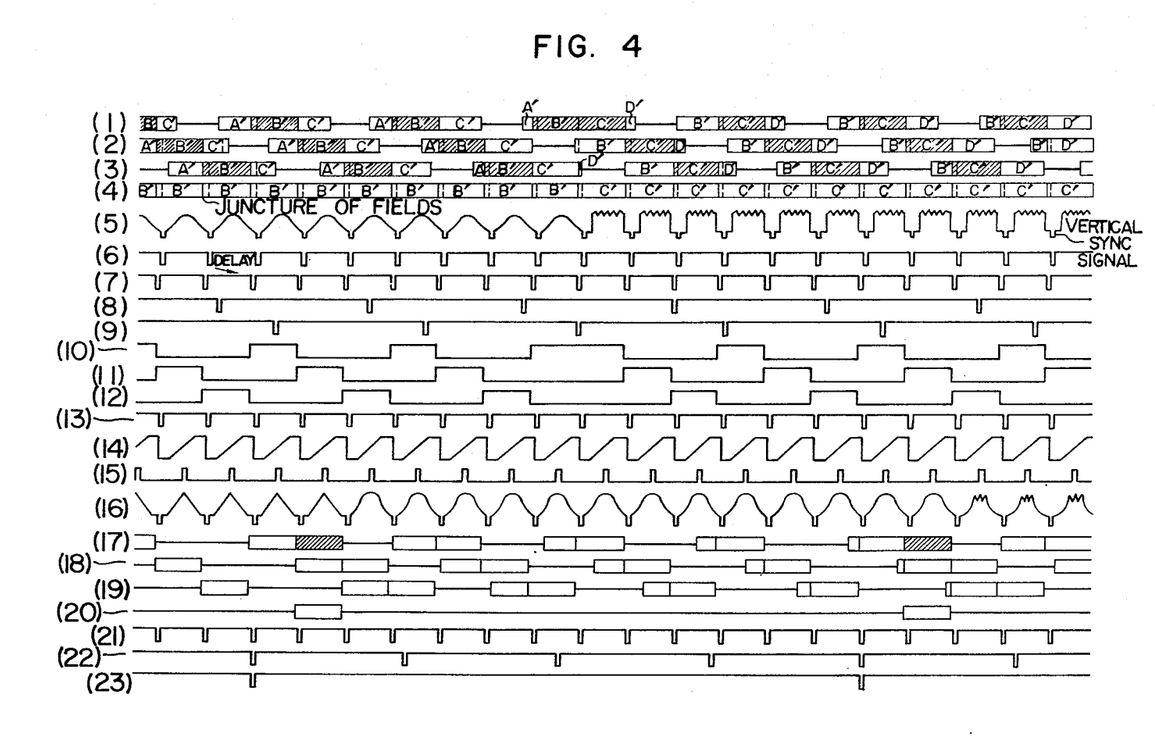
FIGS. 4 and 5 are waveform charts showing signals appearing at various parts of the system of FIG. 1.

As the successive fields A, B, C, . . . as shown in FIG. 3 proceed around the drum 8 of the rotary magnetic head drum assembly 2, the individual rotary magnetic heads 5, 6 and 7 may produce respective output signals as shown at 1, 2 and 3 in FIG. 4. The time chart of this Figure covers a period during which the records of the fields B and C are present on the drum 8. The portions A', B', C' and D' in the signals 1, 2 and 3 in FIG. 4 represent reproduced signals of the respective fields A, B, C and D from the tape.

For continually reproducing still pictures, a signal as shown at 4 in FIG. 4 may be finally obtained by taking out only requisite signals from the outputs of the individual magnetic heads.

This is achieved with the construction of FIG. 1. Here, the outputs of the rotary magnetic heads 5, 6 and 7 (i.e., signals 1, 2 and 3 in FIG. 4) are taken out from the rotary system through respective rotary transformers 16, 17 and 18 and supplied to respective gate circuits 25, 26 and 27 each including an amplifier. (The signal from the rotary transformer 16 is applied through a further gate circuit 24 to the gate circuit 25.) The gate circuits 25, 26 and 27 also receive respective gating signals as shown at 10, 11 and 12 in FIG. 4 produced from a ring counter 32 consisting of three flip-flops to be described later. Thus, the gate circuits 25, 26 and 27 gate only the shaded portions in the signals 1, 2 and 3 in FIG. 4. These gated signals are combined on a mixer 28 to produce the signal 4 in FIG. 4. In many magnetic recording and reproducing systems, the video signal is recorded after frequency modulation in order to overcome the problem of signal level variations and difficulties posed in recording low frequency signals. In such case, the mixer output signal 4 in FIG. 4 may be demodulated in a demodulator 29 shown in FIG. 1. The demodulated video signal is as shown at 5 in FIG. 4. Thus, still picture reproduction may be obtained on a monitor television receiver connected to a terminal 55, and also it is possible to simultaneously reproduce an audio signal from the audio signal reproducing magnetic head 11.

The gating signals 10, 11 and 12 in FIG. 4 may be produced in the following manner.

The modulated video signal output of the demodulator 29 is coupled to a vertical sync signal separator 30 to extract only the vertical sync signal as shown at 6 in FIG. 4. This signal is coupled to a delay circuit 31 to produce a delayed signal as shown at 7 in FIG. 4. The phase of the delayed signal coincides with each junction (indicated by solid line) between adjacent fields in the signal 4 in FIG. 4, as will be described in detail hereinafter. (The dashed lines in the signals 1, 2, 3 and 4 in FIG. 4 indicate the phase of the reproduced vertical sync signal.) The delayed vertical sync signal is coupled to a clock input terminal (or toggle input terminal) T of the ring counter 32. Meanwhile, a permanent magnet 10 is secured to one of the arms 4 rotating with the motor shaft 9, while a stationary magnetic head 9a is disposed above the orbit of rotation of the permanent magnet 10. Thus, with each rotation of the motor 23 a pulse as shown at 8 in FIG. 4 is obtained from the magnetic head 9a. This pulse signal is in a fixed phase relation to the rotation of the rotary magnetic heads 5, 6 and 7 since the rotary magnetic heads are rotated by the motor 23. Thus, by amplifying the output signal (shown at 8 in FIG. 4) of the magnetic head 9a through an amplifier 33 and delaying the amplifier output through a delay circuit 48 a signal of the same phase as the rotational phase of, for instance, rotary magnetic head 5 as shown at 9 in FIG. 4 may be obtained. By supplying this signal to a set input terminal S of the ring counter 32 and setting the count of the delayed vertical sync signal input to the clock input terminal T to the instant of switching of fields (such as the instant of switching of field B' over to C' in FIG. 4) the gating signals 10, 11 and 12 in FIG. 4 may be obtained.

As apparent from the above explanation, this system features a closed loop for producing a gating signal from the reproduced signal and producing a next gating signal from a reproduced signal gated by the first mentioned gating signal. Also, the phase of the junction between adjacent fields may be suitably varied by appropriately varying the delay time of the delay circuit 31 to delay the vertical sync signal. Further, the instant of switching of two successive still pictures may be suitably varied by appropriately varying the rotation phase as shown at 8 in FIG. 4 through the delay circuit 48.

This aspect of the invention will be discussed in further detail. Since a magnetic tape run corresponding to more than two fields is wound on the drum 8 whose whole periphery corresponds to more than three fields as mentioned earlier, the period of each of the intermittent signals produced by each magnetic head covers more than 2 fields. For example, in the signal 1 in FIG. 4 the portion including the complete signals B' and C' also includes part of the preceding and succeeding fields A' and D'. This period during which two complete fields are reproduced is determined by the length of tape run passed around the drum 8. Assuming that the tape length for one field is 167 mm as mentioned earlier and that a tape run with a length of 364 $(= 167 \times 2 + 30)$ mm is passed round the drum 8, two complete fields are reproduced for a period during which the tape is moved by 30 mm. Assuming the tape speed here to be 47.5 mm/sec., two complete fields are reproduced for 0.63 sec. Thus, the instant of switching of two successive still pictures can be varied within the afore-mentioned time interval by appropriately varying the phase of the set pulses shown at 9 in FIG. 4 through the delay circuit 48. The time interval mentioned above may be suitably varied by varying the length of tape run wound on the drum 8.

Meantime, while the video signal and audio signal are recorded on the tape 1 in correspondence to the audio signal reproducing magnetic head 11 and the position of switching of consecutive still pictures (i.e., position of the afore-said set pulses), the location of the magnetic head 11 and that of the rotary magnetic head drum assembly 2 may sometimes depart from that correspondence. In such a case, the reproduction of the video and audio intelligence may be synchronized by adjusting the delay circuit 31.

In the above manner, the video and audio signals are reproduced from a magnetic tape where the video and audio signals are previously recorded in the magnetic track pattern as shown in FIG. 3. In this case, the rotary magnetic heads are rotated at a constant speed independent of the tape speed. Therefore, when the tape speed is varied or when the video signal is reproduced by holding the tape still, the relative speed of tape and rotary magnetic heads will be varied, so that the period of the sync signal in the reproduced video signal will also be varied. If such reproduced signal is coupled to the monitor television receiver, the horizontal as well as vertical synchronization will, in an extreme case, be lost in the reproduction on the picture tube screen. A method of solving this problem will now be discussed.

Heretofore, this inconvenience has been overcome mechanically by coupling the tape drive section and rotary magnetic head drive section by means of a differential gear to hold the speed of the rotary heads relative to the tape unchanged even if the tape speed is changed. With this method, however, control of sufficiently high precision cannot be expected due to the delay involved in gears and other mechanical parts. According to the invention, the control is achieved electrically, and hence with high precision and simple construction. This aspect will now be discussed in connection with the embodiment of FIG. 1.

When the direction of progress of the tape 1 (indicated by arrow 14) is opposite to the direction of rotation of the rotary heads (indicated by arrow 15), the relative speed $v_M$ of the tape and rotary heads with respect to each other is $$v_M = v_T + v_R \tag{1}$$

where $v_T$ is the tape speed and $v_R$ is the peripheral speed of the rotary heads. In order to maintain the relative speed $v_M$ constant, for instance at 10 m/sec., irrespective of the tape speed, the peripheral speed of the rotary heads, i.e., the rpm of the motor 23, may be controlled such that with a change $\delta v_T$ in the tape speed it is charged by a corresponding amount oppositely. Stated mathematically, $$v_M = (v_T + \delta v_t) + (v_R - \delta v_T) = v_T + v_R \tag{2}$$

Thus, the relative speed of tape and rotary heads can be maintained the same as that of equation 1. To achieve this, it is necessary to control the rotation of the motor 23 by instantaneously detecting the tape speed such that with a change $\delta v_T$ in the tape speed the rpm of the motor 23 is changed by a corresponding amount. The tape speed may be detected by detecting a tape speed detection signal of some or other form which is recorded on the tape. Heretofore, it has been the practice to record a continuous signal for the tape speed detection, for instance at a signle frequency, in an especially provided track on the tape and detect the tape speed by reproducing it. In another method, the tape speed detection signal is recorded in superimposition upon the other signal, and in playback it is separated by a filter so as to detect the tape speed from the separated signal. These methods, however, require either a separate track or complicated signal processing.

The invention overcomes these drawbacks and permits automatically maintaining the relative speed of the tape and rotary heads constant irrespective of changes in the tape speed.

In accordance with the invention, a pulse signal as shown at 13 in FIG. 4, having the same repetition period as the vertical sync signal in a television signal (1/59.95 sec. or roughly 16.6 msec. in case of Japan and U.S.A. standard color television system signals), is obtained from an oscillator 45 shown in FIG. 1 and supplied to a ramp wave generator 40 to obtain therefrom a signal as shown at 14 in FIG. 4. This signal is coupled to a phase comparator 41a, to which a delayed vertical sync signal as shown at 15 in FIG. 4 delayed a constant period with respect to the reproduced video signal as will be described hereinafter is also coupled from a switching circuit 39, and which compares the phases of the two input signals to produce an error voltage representing the phase difference between the two signals.

To obtain the delayed vertical sync signal here, the vertical snyc signal (shown at 6 in FIG. 4), which is obtained from the vertical sync signal separator 30 receiving the reproduced video signal (shown at 5 in FIG. 4) from the demodulator 29, is coupled through the switching circuit 39 to be described later to a delay circuit 37. In this way, the delayed vertical sync signal as shown at 15 in FIG. 4 is obtained.

The phase difference signal obtained from the phase comparator 41a is coupled through a drive amplifier 41b to the motor 23 which is capable of phase control. In this way, the motor 23 can be controlled such as to maintain a fixed phase relation between the vertical snyc signal in the reproduced video signal and the reference signal obtained from the oscillator 45 at the same frequency as the vertical sync signal. This will be discussed in further detail. The vertical sync signal (6 in FIG. 4) obtained from the vertical sync signal separator circuit 30 indicates the recorded position of the vertical sync signal in the video signal recorded on the tape prevailing around the drum; that is, the instant of reproduction of the vertical sync signal by the rotary magnetic heads or rotational phase of the rotary magnetic heads. Thus, by controlling the motor 23 with the error signal obtained from the phase comparator 41a phase comparing the reference signal from the oscillator 45 and the delayed vertical sync signal delayed a constant delay period from the reproduced video signal, the reproduced video signal (shown at 5 in FIG. 4) and the reference signal (shown at 13 in FIG. 4) may be held in phase with each other.

Now, the reason why the afore-mentioned control permits the relative speed of tape and rotary heads to be held constant irrespective of the tape speed will be discussed. Since the period of the vertical sync signal in the reproduced video signal is the same as the reference signal period $$T_s = \frac{1}{f_s},$$

$f_s$ being the frequency of the reference signal (59.95 Hz as mentioned earlier), the distance covered by the tape during this period $T_s$ is $\nu_T \times T_s$, where $\nu_T$ is the tape speed. Denoting the peripheral speed of the rotary heads by $\nu_R$ and the radius of the drum (i.e., radius of rotation of the rotary heads) by $r$, $$\nu_R T_s = \frac{2\pi r}{3} - \nu_T T_s \qquad (3)$$

Hence, $$\nu_R = \frac{2\pi r}{3T_s} - \nu_T = r \cdot \frac{2\pi}{3T_s} - \nu_T$$

$$= r\omega_R - \nu_T \qquad (4)$$

where $$\omega_R = \frac{2\pi}{3T_s}$$

represents an angular speed required for each head to complete one revolution in a period of $3 \times T_s$ and is constant when the reference signal frequency is constant; that is, the peripheral speed of the drum when the tape is still. Substituting equation 4 in equation 1 defining the relative speed of tape and rotary heads, $$\nu_M = \nu_R + \nu_T = (r.\omega_R - \nu_T) + \nu_T = r.\omega_R$$

This value corresponds to $\nu_R$ when the tape is still and is hence constant. This relation of course holds when the tape speed is zero, that is, when the tape is still.

Figure 5:
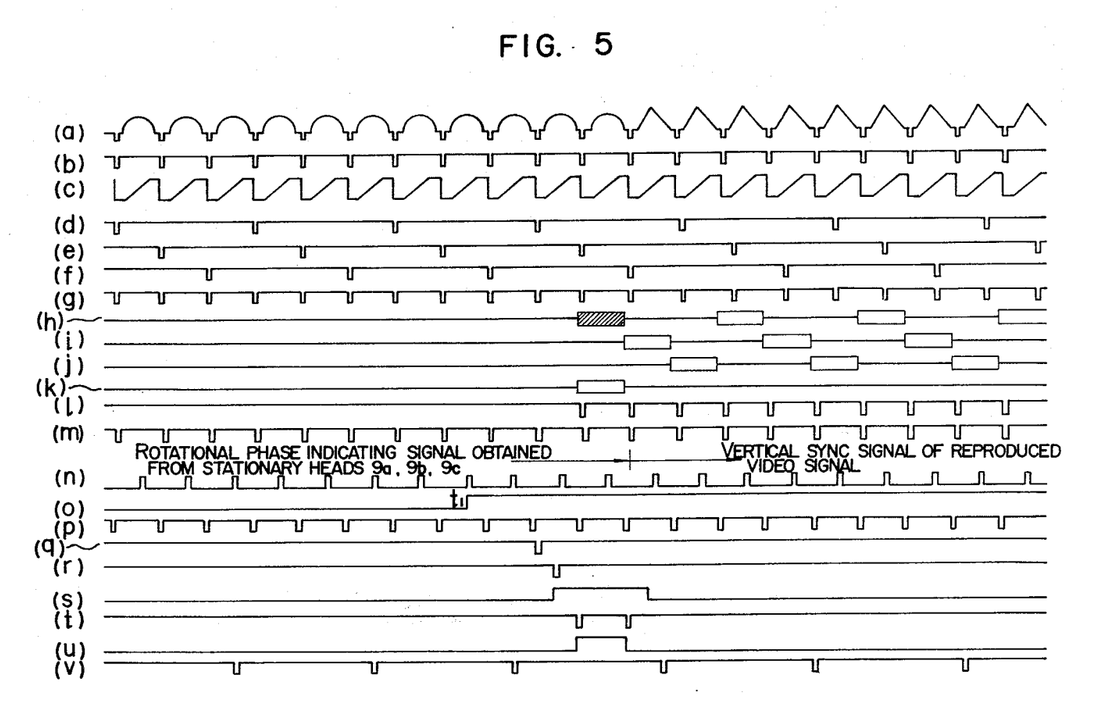

The above control can also be applied in recording, that is, the video signal can be recorded and reproduced at the same relative speed both in recording and in reproduction. This will now be discussed in detail. The audio signal is coupled to a terminal 43, amplified through a recording amplifier 22 and then supplied through the R terminal of a switch 20 to the stationary magnetic head 11 for recording on the tape 1. This is done in the same way as in an ordinary sound tape recorder. Meanwhile, the video signal is coupled to a terminal 44 and recorded in a manner which will now be described. A video signal as shown at $a$ in FIG. 5 is coupled to the terminal 44 and thence to a vertical sync signal separator circuit 46 and also to a frequency modulator 51 to be described later. The vertical sync signal separator circuit 46 produces a signal as shown at $b$ in FIG. 5 having the same period as that of the afore-mentioned reference signal obtained from the oscillator 45. In other words, the oscillator 45 is disconnected during recording from the power supply, and instead the vertical sync signal separated from the video signal by the vertical sync signal separator circuit 46 is supplied to the ramp wave generator 40. The ramp wave generator 40 thus produces a signal shown at $c$ in FIG. 5. Similar to the case of playback, the tape 1 for recording is passed around the drum 8 and driven by the capstan and pinch roller. However, it is held still until the first field is recorded. If no signal is recorded in the initial or leading portion of the tape, no reproduced signal can be initially obtained from the afore-mentioned demodulator 29, so that the control of the motor 23 according to the vertical sync signal in the reproduced signal as mentioned earlier in connection with the reproducing method cannot be obtained. Accordingly, until the first field is recorded on the tape, a signal indicating the rotational phase of the rotary magnetic heads and obtained from stationary magnetic heads 9a, 9b and 9c spaced apart at an angular interval of 120° is fed to the phase comparator 41a mentioned above for controlling the motor 23.

The process of obtaining the rotary magnetic head rotational phase signal from the stationary magnetic heads 9a, 9b and 9c will now be discussed in greater detail. The stationary magnetic heads 9a, 9b and 9c are arranged at uniform angular spacing above the drum as shown in FIG. 2, so that they provide respective pulse signals as shown at $d$, $e$ and $f$ in FIG. 5 every time the permanent magnet 10 mounted on the arm carrying the rotary magnetic head 5 clears the underside of them. The output pulse signals of the stationary magnetic heads 9a, 9b and 9c are amplified through respective amplifiers 33, 34 and 35, whose outputs are combined in a mixer 36 to provide a signal as shown at $g$ in FIG. 5. (This signal indicates the rotational phases of the three rotary magnetic heads 5, 6 and 7.) This signal is coupled to the switching circuit 39 to be described later, and the output signal thereof as shown at $m$ in FIG. 5 is delayed a predetermined delay period through the delay circuit 37 to produce a delayed signal as shown at $n$ in FIG. 5, which delayed signal is coupled to the phase comparator 41a.

The phase comparator 41a also receives the ramp wave signal as shown at $c$ in FIG. 5 produced from the afore-mentioned vertical sync signal, and it produces a signal representing the phase difference between its two input signals. By coupling this signal through the drive amplifier 41b to the motor 23 the rotary magnetic heads can be rotated in a constant phase relation to the vertical sync signal in the video signal supplied from the terminal 4.

For the above control of the motor 23, the stationary magnetic heads 9a, 9b and 9c are arranged such that the magnetic head 9b lies in a line connecting the center (indicated at $b$ in FIG. 2 ) of the tape run in contact with the drum periphery and the center of the drum and the other two magnetic heads 9a and 9c are angularly spaced by 120° from the magnetic head 9b in the opposite directions. With this arrangement, one field of video signal may be recorded between points $a$ and $b$ by any one of the rotary magnetic heads. The recording of a video signal for one field between the points $a$ and $b$ by the rotary magnetic head 5 will now be considered. To do so, it is necessary to extract a signal for one field which is timed to be recorded between the points $a$ and $b$ by the rotary magnetic head 5. The method of extracting this signal will now be discussed.

The rotational phase pulses from the aforementioned stationary magnetic head 9a (i.e., signal from the amplifier 33, as shown at $d$ in FIG. 5) are supplied to a phase comparator 49a, to which the signal $m$ in FIG. 5 produced from the switching circuit 39 is also coupled. Then, by applying a recording start command signal $o$ in FIG. 5 to a terminal 49c from instant $t_1$, a pulse $q$ in FIG. 5 is produced when a subsequent rotational phase pulse shown at $d$ in FIG. 5 coincides in phase with the output signal $m$ in FIG. 5 produced from the switching circuit 39. (Since the signal $m$ in FIG. 5 is a rotational phase pulse signal as mentioned earlier, the pulse $q$ in FIG. 5 coincides with a rotational phase pulse $d$ in FIG. 5 subsequent and closest to instant $t_1$.) The signal $q$ in FIG. 5 which is obtained from the phase comparator 49a is coupled to a gating signal generator 49b. The gating signal generator 49b delays the input pulse by 1/3 V (V being the vertical sync period and roughly 16.6 msec.) as shown at r in FIG. 5 and produces from the delayed pulse a gating pulse as shown at s in FIG. 5 with a duration of about 2 V. This gating pulse is fed to a gate circuit 50 for gating a signal p in FIG. 5 produced from the delay circuit 47 delaying a predetermined delay period the vertical sync signal (shown at b in FIG. 5) separated from the input video signal by the vertical sync signal separator circuit 46, thus obtaining a signal shown at t in FIG. 5. This signal is coupled to an input terminal T of the flip-flop 54, and the afore-mentioned rotational phase pulse signal d in FIG. 5 obtained from the magnetic head 9a is coupled to a set input terminal S of the flip-flop. Thus, a signal as shown at u in FIG. 5 is obtained from an output terminal Q of the flip-flop 54, while an inversion output with respect to the signal $\underline{u}$ in FIG. 5 is obtained from the other output terminal $\overline{Q}$ of the flip-flop. These signals are respectively coupled to a gate circuit 52 and the gate circuit 24 to be described later. Where a video signal is recorded as frequency modulation on a magnetic tape, the video signal input (shown at a in FIG. 5) to the input terminal 44 is coupled to a frequency modulator 51 for frequency modulation. The resultant frequency modulated signal is supplied to the gate circuit 52 and gated thereby under the control of the signal u in FIG. 5 to obtain a signal k in FIG. 5. This gated video signal may be coupled through a buffer amplifier 53 and rotary transformer 16 to the rotary magnetic head 5 for recording on tape between the point a and b of the drum 8.

Until this first field is recorded on the blank tape, the tape is held still, that is, the capstan motor 19 is held inoperative. Then, as soon as the recording of this field is completed, the capstan motor 19 is connected to a power source to drive the tape. As soon as the tape drive is started, the recorded video signal is reproduced by the individual rotary magnetic heads 5, 6 and 7. The reproduced signals from the individual rotary magnet heads 5, 6 and 7 are respectively shown at h, i and j in FIG. 5 except for the shaded portion, which is not a reproduced signal but is the recorded signal.

The recorded video signal is reproduced by mixing the reproduced signals from the rotary magnetic heads 5, 6 and 7 and demodulating the resultant output. More particularly, the reproduced signals from the individual rotary magnetic heads 5, 6 and 7 are amplified through the afore-mentioned respective gate circuits 25, 26 and 27 including respective amplifiers, the amplified outputs are combined in the mixer 28, and the resultant output is demodulated in the demodulator 29 to obtain the demodulated video signal at the terminal 55. The gating signals to be coupled to the gate circuits 25, 26 and 27 are produced by the method mentioned earlier and hence are not further discussed here.

Here, the afore-mentioned buffer amplifier 53 and gate circuit 24 will be described. This amplifier 53 is a unilateral amplifier. More particularly, while this amplifier amplifies the afore-mentioned frequency modulated video signal k in FIG. 5 supplied to the rotary magnetic head 5, it does not constitute a load with respect to the converse signal reproduced from the rotary magnetic head 5. The gate circuit 24 includes a variable gain amplifier, which provides a gain of unity with respect to the reproduced signal from the rotary magnetic head for coupling it in situ to the gate circuit 25, while changing the level of the recording signal from the buffer amplifier 53 to substantially the same level as the reproduced signal. The shaded portion in the signal h in FIG. 5 represents this level changed signal supplied to the gate circuit 25.

Since the reproduced video signal is obtained from the demodulator 29 after the first field has been recorded in the above manner, the vertical sync signal separator circuit 30 produces a vertical sync signal as shown at l in FIG. 5. (This signal is produced immediately after the recording of the video signal.) This signal is coupled to the switching circuit 39 and a signal detection circuit 38, which gives a switching control signal to the switching circuit 39 when it receives the vertical sync signal from the vertical sync signal separator circuit 30. More particularly, while in the initial blank state of the tape the switching circuit 39 transmits the rotational phase pulse signal from the mixer 36 to the delay circuit 37 and phase comparator 49a as mentioned earlier, with the vertical sync signal provided in the afore-mentioned manner (due to reproduction of video signal from the tape) it transmits this vertical sync signal to the delay circuit 37 and phase comparator 49a. Thus, the switching circuit 39 provides the output m in FIG. 5 constituted by the rotational phase signals obtained from the magnetic heads 9a, 9b and 9c before the recording of the video and the vertical sync signal in the reproduced video signal after recording.

Subsequent to the recording of the first field in the above manner, the second field is recorded in a manner to be described. For recording the second field, the motor 23 is controlled by the vertical sync signal in the input video signal and that in the reproduced video signal since the latter vertical sync signal is obtained from the switching circuit 39. More particularly, the ramp wave signal (shown at c in FIG. 5) produced from the former vertical sync signal by the ramp wave generator 40 and the output signal of the delay circuit 37 (shown at n in FIG. 5) are fed to the phase comparator 41a, so that the motor 23 is controlled such that the phases of these two signals coincide with each other.

In this state, the relations of equations 3 and 4 also hold, that is, the mutual speed of tape and rotary heads is the same as at the time of the afore-mentioned recording of the first field. (At the time of the recording of the first field the tape is held still.) This means that when the tape is running the peripheral speed of the rotary magnetic heads is reduced from that at the time of the still state of the tape by an amount corresponding to the tape speed. Thus, the period of the rotational phase pulse signals d, e and f in FIG. 5 while the first field is being recorded is changed in the subsequent reproducing state; it is extended in the reproducing state.

The recording of the second field is done when the tape portion for recording comes between the points a and b on the drum of FIG. 2. At this time the tape portion on which the first field is recorded is to be found between the points b and c so that the second field can be continuous to the first field. In other words, the second field may be recorded in the manner described above in the recording of the first field from the detection of an instant when the tape portion on which the first field is recorded comes between the points b and c. Although the instant from which the second field is recorded is not shown in FIG. 5, signal a in FIG. 5 corresponds to signal 16 in FIG. 4, signal b to signal 13, signal d to signal 22, signal h to signal 17, signal i to to signal 28, signal $j$ to signal 19, signal $k$ to signal 20, signal $m$ to signal 21, signal $n$ to signal 15, and signal $a$ to signal 23. Also, although no signals corresponding to the signals $r$ to $u$ in FIG. 5 are shown in FIG. 4, the one field gating signal $u$ in FIG. 5 may be produced in the afore-mentioned manner from the flip-flop 54 inasmuch as the signal 23 in FIG. 4 (signal $q$ in FIG. 5) is obtained.

It will be understood from the above that the video signal for one field is recorded from the instant when the tape portion for recording comes between the points $a$ and $b$ on the drum 8. The tape is held still for recording only the first field, and the subsequent fields may be recorded while the tape is running. Besides, all the fields are recorded on respective track portions of the same length and contiguous to adjacent ones such as shown as video signal track 56 in FIG. 3. If the tape speed is $v_T = 4.76$ cm/sec. and radius of rotation of the rotary magnetic heads is $r = 8$ cm, the time interval $t_i$ from the instant of start of recording of one field till that of the next one while the tape is running is $$t_i = \frac{2\pi r}{3v_T} = 3.6 \text{ sec.}$$

This time interval $t_i$ is the pulse repetition period of the signal 23 in FIG. 4 obtained from the phase comparator 49a. Each pulse of this signal 23 in FIG. 4 is obtained when the phase of the signal 21 in FIG. 4 obtained from the switching circuit 39 coincides with the phase of the rotational phase pulse signal 22 in FIG. 4 obtained from the magnetic head 9a. This pulse has to be produced when the drum 8 assumes a certain predetermined position, for instance with the magnet 10 occupying the position to face the magnetic head 9a in the instant case, since the field extraction signal, i.e., signal $u$ in FIG. 5, is obtained from the flip-flop 54 on the basis of this pulse. However, this condition may sometimes fail to be met depending upon such factors as tape speed, radius of rotation of the rotary heads and vertical sync signal period. It may be met if there are $3n + 1$ fields (n being a positive integer) between adjacent fields recorded (rounded portions in the signal 17 in FIG. 4). Thus, denoting the tape speed by $v_T$, the vertical sync signal period by $T_s$ and relative speed of tape and rotary magnetic heads by $v_M$ $$(3n + 1) \times v_T \times T_s = v_M \times T_s.$$

Hence, $$n = \frac{v_M - v_T}{3v_T} \quad (5)$$

Since $$v_M = r\omega_M = r \cdot \frac{2\pi}{3T_s}$$

as mentioned earlier, equation 5 holds if $n = 70$, $r = 8.003$ cm, $v_T = 4.76$ cm. sec. and $$T_s = \frac{1}{59.95} \text{ sec.}$$

Now, the phase of the horizontal sync signal at the juncture between adjacent continuous fields recorded on the tape will be considered. In case where each field is recorded for every $(3n + 1)$ fields, there may happen that adjacent recorded fields are not like fields. More particularly, if the input video signal is the general composite signal based on the frequency interleave, with two successive fields constituting one frame, there may happen that the $(3n + 1)$-th field may not always be like fields, but even and odd fields may alternately be recorded as the $(3n+1)$-th field depending upon the value of $n$ which is a positive integer as mentioned above. If $(3n+1)$ is an even number, the $(3n+1)$-th fields which are recorded are all like fields, that is, either even fields or odd fields alone are recorded. On the other hand, if $(3n + 1)$ is an add number, even and odd fields are alternately recorded as the $(3n + 1)$-th field. In the latter case, where even and odd fields are alternately recorded as the $(3n + 1)$-th field, with $(3n + 1)$ being an odd number, the phase of the horizontal sync signal is consistent for all recorded fields, that is, it is not shifted at the juncture between adjacent even and odd recorded fields. In the case where $(3n + 1)$ is an even number, however, adjacent fields are like fields, that is, either all even or odd fields, so that the horizontal sync signal phase is shifted by ½ H (H being the horizontal sync period) at the juncture between adjacent fields. This would give rise to distortion of an upper portion of the reproduced picture. In such case, that is, if $(3n + 1)$ is an even number, the consistency of the horizontal sync signal phase may be maintained if the recording is made in the following way.

Since one field is 262.5 H, the recording is started when the tape is moved by a distance corresponding to 262 H (or 261 H or 260 H) after previous recording of one field so as to produce an overlapped record portion of ½ H. To do so, the recording is made from the instant when a signal obtained by delaying the rotational phase pulse signal 22 in FIG. 4 by 0.5 H and the signal 21 coincide with each other. In this way, an overlapped record portion of ½ H results, thus providing for consistency of the horizontal sync signal phase at the juncture between adjacent fields.

Figure 6:
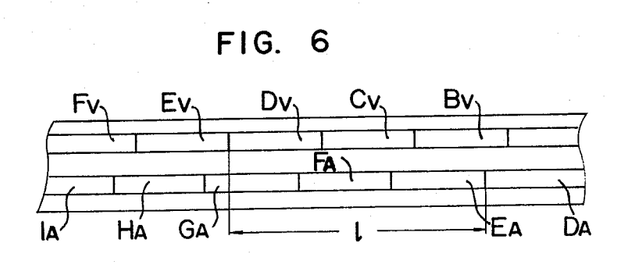
FIG. 6 is a view showing a record track pattern on a magnetic tape for illustrating a certain method of recording with the magnetic recording system according to the invention.

Now the positional relation between the audio and video signals recorded on the tape will be considered. While the method of reproducing the audio and video signals from the tape having the record track pattern as shown in FIG. 3 has been described above, in this case the timing of reproduction of the audio and video signals with respect to one another is determined by the record pattern on the tape. For example, the reproduction of the field E shown in FIG. 3 is started when the track portion of this field comes between the points $a$ and $b$ on the drum 8 shown in FIG. 2 as mentioned earlier. In order for the voice commentary of the reproduced picture of this field to be reproduced simultaneously, the length $l$ of the tape between the audio head 11 and point $b$ on the drum 8 as shown in FIG. 2 must satisfy a relation as shown in FIG. 6; more particularly, the distance between the leading end of the video signal record of field $E_V$ and the leading end of the corresponding audio signal record $E_A$ has to be $l$. This is achieved by the aforementioned recording method where one field of video signal is recorded between the points $a$ and $b$ on the drum; that is, in this case the recording of the video signal of the field $E_V$ between the points $a$ and $b$ can be made from the instant of start of recording the corresponding audio signal $E_A$.

While perfect synchronization between the reproduced sound and picture can be obtained in the reproduction of the above record, in the case where the audio signal is recorded on the tape prior to the recording of the corresponding video signal, it is necessary to arrange such that the video signal is recorded by reproducing the corresponding audio signal previously recorded on the tape. In this case, unlike the afore-mentioned case, the recording of one field of video signal has to be made between the points $b$ and $c$ on the drum. For example, at the instant when the reproduction of the audio signal $E_A$ in FIG. 6 by the audio head 11 is ended, the tape portion for recording the corresponding video signal field $E_V$ is found between the points $b$ and $c$, so that the recording has to be made between these points if synchronization between the video and audio signals has to be obtained.

Figure 7:
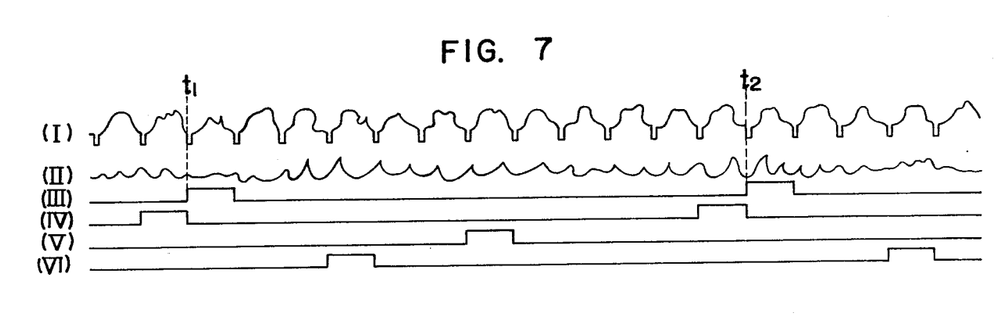
FIGS. 7 and 8 are waveform charts for illustrating a certain recording method with the magnetic recording system according to the invention.

The above recording methods are contemplated for recording an audio signal on the basis of a corresponding video signal field for a still picture or for recording a video signal field for a still picture on the basis of a corresponding audio signal. Where there is information about the moving picture and simultaneous sound, for instance where a continuous video signal for a moving picture and simultaneous audio signal are available from an ordinary video tape recorder, with the above system for recording, a video signal between the points $a$ and $b$ on the drum 8 one field of video signal corresponding to an initial portion of the sound information is recorded. This will be discussed in connection with FIG. 7. In FIG. 7, (I) indicates the continuous video signal, while (II) indicates the simultaneous audio signal. While the audio signal is continuously recorded by the stationary head 11, the video signal is recorded intermittently field by field at a predetermined interval as mentioned earlier; more particularly, one field is recorded from instant $t_1$, and after a certain interval of time the next field is recorded from instant $t_2$, as shown at (III) in FIG. 7. If the recording of one field is made between the points $a$ and $b$ on the drum 8, an audio signal portion between the instants $t_1$ and $t_2$ corresponds to the field recorded from the instant $t_1$. Actually, the successive fields of the video signal between the instants $t_1$ and $t_2$ vary, and desirably the video information recorded from the instant $t_1$ is most fitted to the corresponding audio information. However, this may not always be the case. To record a most desired field among the continuous moving picture information the position of recording of the picture information may be shifted with respect to the position of recording of the corresponding sound information. A method of doing this will now be described.

In the afore-mentioned method of recording a video signal between the points $a$ and $b$ on the drum 8 shown in FIG. 2, the video signal track as shown in FIG. 3 can be obtained by controlling the motor 23 according to the vertical sync signal in the recorded video signal recorded on the tape and the vertical sync signal in the input video signal. While in this case the relation between the positions of recording of the audio and video signals on the tape may be varying the position of the audio head 11, to do so is very troublesome and is not desired. Accordingly, the position of recording of the video signal on the drum is varied to change the relation between the recording positions of the audio and video signals. For example, the video signal is not recorded between the points $a$ and $b$ on the drum but is recorded between points $d$ and $e$ (angularly spaced apart by 20 degrees) or between points $c$ and $b$, whereby the relation between the recording positions of the audio and video signals can be varied.

When recording one field of a video signal over a desired portion of the drum periphery other than that between the points $a$ and $b$, the aforementioned vertical sync signal in the recorded video signal is not obtained. For example, when the recording is made between the points $d$ and $e$, a leading portion of the previously recorded field, i.e., a tape portion where the vertical sync signal of the previous field is recorded, was already departed from the drum and is found in the neighborhood of the guide pole 3a in FIG. 2, so that the reproduced vertical sync signal is no longer obtained. Thus, the control according to the reproduced sync signal can no longer be made.

Figure 8:
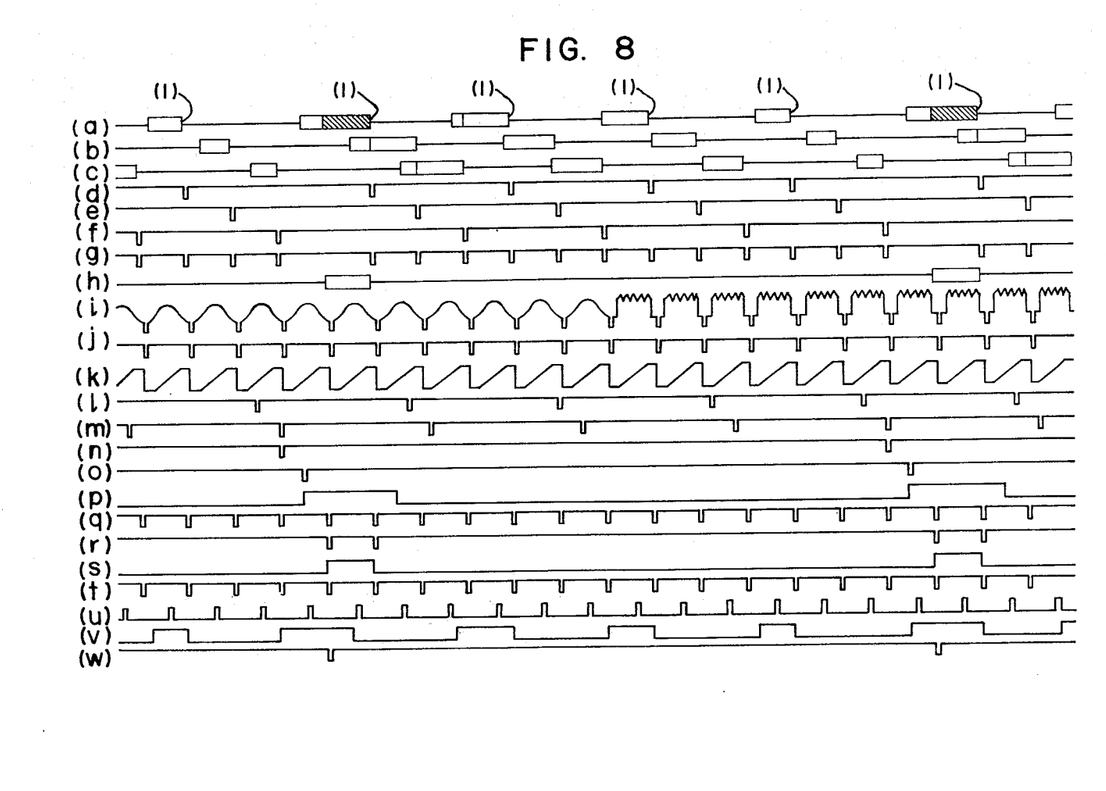

Accordingly, in this case a signal shown at $d$ in FIG. 8 is produced by shaping a signal shown at $a$ in FIG. 8 reproduced by one of the rotary magnetic heads. As is shown, the phase of each pulse in the signal $d$ coincides with the edge (1) of the corresponding signal in the signal $a$. Similarly, signals shown at $e$ and $f$ are produced by shaping respective signals shown at $b$ and $c$ reproduced by the other rotary magnetic heads. These signals $a$, $b$ and $c$ in FIG. 8 are combined together to produce a signal $g$ in FIG. 8, which signal is substituted for the afore-mentioned reproduced vertical sync signal.

Figure 9:
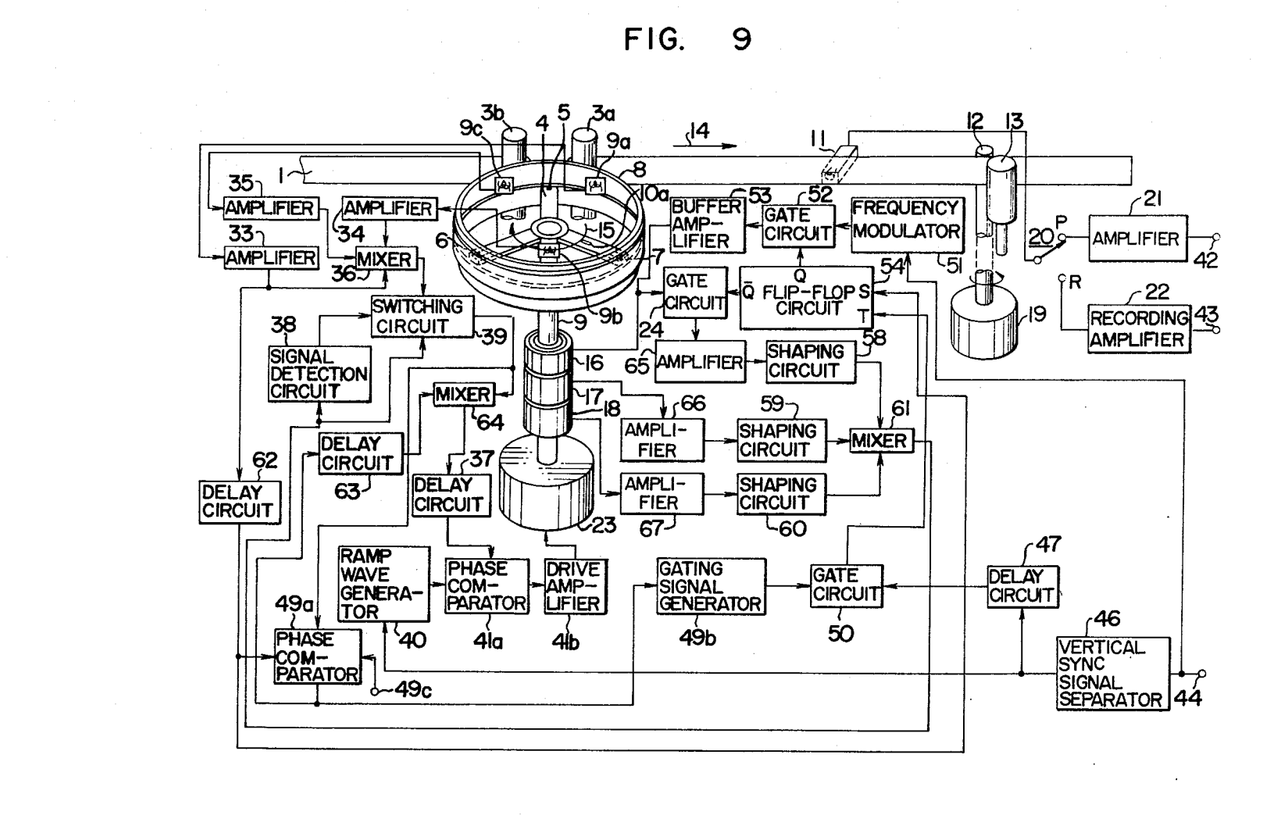
FIG. 9 is a block form representation of the essential part of a second embodiment of the invention.

A specific circuit construction to this end is shown in FIG. 9. In FIG. 9, the same blocks as those in FIG. 1 are designated by like reference numerals. The plan view of the rotary magnetic head drum assembly in this system is shown in FIG. 10 (which corresponds to FIG. 2).

Figure 10:
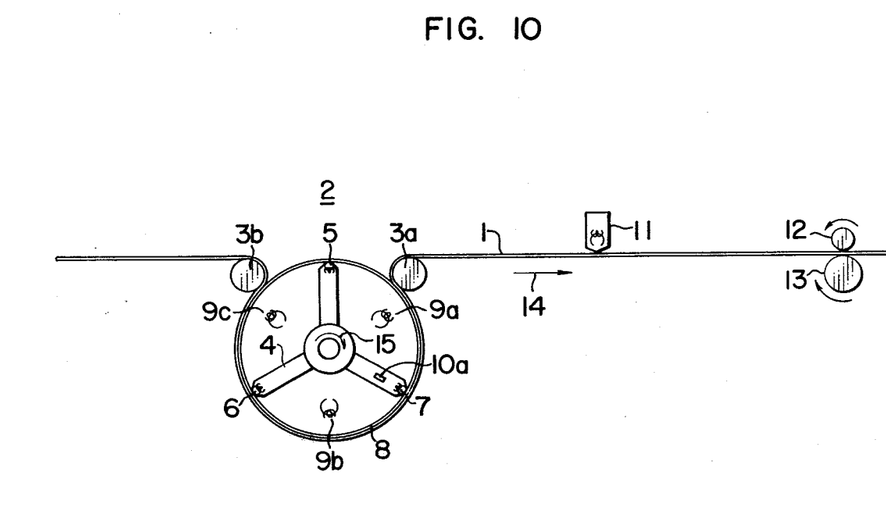
FIG. 10 is a top view of the rotary magnetic head drum assembly in the system of FIG. 10.

If intermittent fields of input video signal are recorded as successive fields on the tape by recording each field between points $e$ and $d$ on the drum shown in FIG. 10, the signals $a$, $b$ and $c$ in FIG. 8 are reproduced from the respective rotary magnetic heads 5, 6 and 7. Since no perfect record of one field is always available in this case, these signals $a$, $b$ and $c$ in FIG. 8, unlike the signals 17, 18 and 19 in FIG. 4, consist of a series of signals of decreasing duration with the progress of the tape. Also, they indicate that the record portion of the vertical sync signal is already departed from the drum so that the afore-mentioned control according to the reproduced vertical sync signal is no longer obtained. Accordingly, the signal $g$ in FIG. 8 obtained by shaping reproduced signals is used.

The signal $g$ in FIG. 8 may be obtained by amplifying the outputs of the respective heads through respective amplifiers 65, 66 and 67, and coupling the amplified signals to respective shaping circuits 58, 59 and 60 for envelope detection and shaping of the detected signals. For instance, by envelope detecting the reproduced signal $a$ in FIG. 8, a signal shown at $v$ in FIG. 8 is obtained, and shaping this signal through differentiation the signal $d$ in FIG. 8 is obtained. The signals $d$, $e$ and $f$ in FIG. 8 obtained from the respective shaping circuits 58, 59 and 60 are combined in a mixer 61 to obtain the signal $g$ in FIG. 8. In the signal $g$ in FIG. 8 some pulses are missing. Each missing pulse results right at the juncture between the previous record and the new record (shaded portion in the signal $a$ in FIG. 8). The missing portions of the signal $g$ in FIG. 8 may be made up for by a signal $w$ in FIG. 8, which is produced from a recording command signal $n$ in FIG. 8.

The signal $g$ in FIG. 8 produced from the mixer 61 is supplied to signal detection circuit 38 and switching circuit 39. These circuits operate in the same way as those mentioned earlier in connection with FIG. 1, so they are not described any further. When the output signal g in FIG. 8 begins to be produced from the mixer 61, the signal detection circuit 38 produces a switching control signal, under the control of which the signal having been supplied to the switching circuit 39 is switched. In the initial stage when no signal is recorded on the tape, that is, in the absence of the output signal of the mixer 61, the switching circuit 39 transmits the rotational phase pulse signal coupled from the mixer 36. Then, as soon as the first signal is recorded, the output of the mixer 61 becomes available. From this instant, the output of the mixer 61 is transmitted through the switching circuit 39.

Before this instant, that is, when the rotational phase pulse signal from the mixer 36 is available through the switching circuit 39, no signal is yet recorded on the tape. Thus, the instant method will now be considered from the instant from which the first field is recorded. At this time, the operational mode is substantially the same as the afore-mentioned recording method using the reproduced vertical sync signal (described in connection with FIGS. 1 and 5). In the system of FIG. 1 the rotational phase pulse signal from the amplifier 33 is directly coupled to the phase comparator 49a, whereas in the system of FIG. 9 the output of the amplifier 33 is coupled through a delay circuit 62 to the phase comparator 49a. While in the system of FIG. 1 the permanent magnet 10 is mounted on the arm 4 carrying the rotary magnetic head 5, in the system of FIG. 9 it is mounted on arm 4 carrying rotary magnetic head 7 (and designated at 10a since it is mounted in a different position with respect to FIG. 1). Thus, the amplifier 33 produces an output pulse every time rotary magnetic head 7 just comes to the underside of the stationary magnetic head 9a. This signal is as shown at y in FIG. 5, and it is delayed through the delay circuit 62 to obtain the signal d in FIG. 5. (While the same signals as those mentioned in connection with FIG. 1 are discussed here, the instant method is the same as the recording method discussed earlier in connection with FIG. 1 until the step of obtaining the gating signal for gating one field as shown at u in FIG. 5.)

As mentioned above, the signal g in FIG. 8 is obtained from the mixer 61 and permitted through the switching circuit 39 after the first field is recorded. This signal is coupled to mixer 64 and phase comparator 49a. The phase comparator 49a also receives a signal m in FIG. 8 produced from the delay circuit 62 delaying the rotational phase pulse signal l in FIG. 8 obtained from the amplifier 33, and it produces a signal n in FIG. 8 when the phases of the two input signals coincide with each other. The signal n thus obtained is coupled to gating signal generator 49b, which in turn produces a signal as shown at p in FIG. 8. The signal p in FIG. 8 produced from the gating signal generator has a duration of about 2 V, and it is produced on the basis of a signal o in FIG. 8 obtained by delaying the signal n in FIG. 8 by about 1/3 V, where V is the period of the vertical sync signal. It is coupled to gate circuit 50 connected to flip-flop circuit 54, these circuits being the same as those mentioned earlier. The gate circuit gates signal q in FIG. 8 from delay circuit 47 delaying the vertical sync signal in the input video signal under the control of the gating signal p in FIG. 8 to obtain a signal r in FIG. 8, from which signal the flip-flop 54 produces a signal s in FIG. 8.

Meanwhile, the signal g in FIG. 8 from the switching circuit 39 is also coupled to the mixer 64, to which a signal w in FIG. 8 produced from a delay circuit 63 delaying the signal h in FIG. 8 from the phase comparator 49a, and which produces a signal t in FIG. 8 by making up for the missing portions of the signal g in FIG. 8. This signal t in FIG. 8 is coupled to delay circuit 37 to produce a delayed signal u in FIG. 8 coupled to phase comparator 41a. Since a signal k in FIG. 8 produced by ramp wave generator 40 from the vertical sync signal in the input is also coupled to the phase comparator 41a as mentioned ear in connection with FIG. 1, the phase comparator 41a produces a phase difference signal between its two input signals. By amplifying this phase difference signal through drive amplifier 41b and coupling the amplified signal to motor 23, the motor 23 is phase controlled such that the vertical sync signal j in FIG. 8 separated from the input video signal and signal g in FIG. 8 produced from the mixer 61 combining the signals a, b and c in FIG. 8 are held in a fixed phase relation to each other. This method is a modification of the afore-mentioned control method based on the vertical sync signal in the reproduced video signal and that in the input video signal, and it permits recording one field of video signal in a changed position on the drum by using the output signal of the mixer 61 combining the signals reproduced from the individual rotary magnetic head in lieu of the vertical sync signal in the reproduced video signal.

The waveforms shown in FIG. 8 apply to the case of recording one field between the points d and e on the drum 8, and this recording position may be suitably changed by appropriately varying the delay time of the delay circuit 62. In other words, while the rotary magnetic head rotational phase signal in FIG. 8 is delayed by the delay circuit 62 to produce the signal m in FIG. 8, by varying the delay time of the delay circuit 62 the position of generation of the output pulse (signal n in FIG. 8) of the phase comparator 49a may be varied to vary the recording position on the drum. In this way, the recording field of the moving picture information described earlier in connection with FIG. 7 may be freely changed. When the recording is made between the points a and b on the drum in FIG. 2, fields corresponding to the pulses shown at (III) in FIG. 7 are recorded. When the recording is made between the points b and c, fields corresponding to the pulses shown at (IV) are recorded. When the recording position is between points d and e, pulses substantially is shown at (V) are generated. Further, in the case of recording between points f and g, fields corresponding to the pulses shown at (VI) are recorded. In this way, the relation between the position of recording of video signal over the drum and position of recording of the corresponding audio signal may be varied.

What we claim is:

1. In a magnetic recording system for recording an input video signal, said system including a rotary magnetic head drum assembly having a drum and a plurality of rotary magnetic heads spaced apart at a predetermined angular interval; motor drive means for driving a magnetic tape wound around the outer periphery of said drum in a predetermined direction at a predetermined speed, said magnetic tape being wound around the outer periphery of said drum in the shape of the character $\Omega$, the improvement comprising:

video signal recording circuit means for receiving said input video signal and coupling said video signal to one of said rotary magnetic heads, a video signal corresponding to said input video signal being recorded on said magnetic tape field by field in the lengthwise direction thereof; and motor control means for controlling the rotational phase of said rotary magnetic heads comprising first means coupled to said plurality of rotary magnetic heads for producing a first signal corresponding to a video signal previously recorded on said magnetic tape, second means for extracting a sync signal from said input video signal and producing a second signal, and phase comparator means coupled to said first and second means and to said motor means for obtaining a signal corresponding to the difference in phase between said first and second signals for controlling said motor means so that each subsequently recorded video signal field is recorded on said magnetic tape in a record track portion having a fixed length.

2. The magnetic recording system defined by claim 1, wherein said video signal recording circuit means includes a frequency modulator for frequency modulating said input video signal to be recorded;

a gate circuit coupled to said frequency modulator for extracting a video signal field to be recorded from the output of said frequency modulator; and a buffer amplifier coupled to said gate circuit and to said one rotary magnetic head for video signal recording.

3. The magnetic recording system defined by claim 2, wherein said first means comprising said motor control means includes a plurality of gate circuits coupled to said plurality of rotary magnetic heads for gating reproduced signals from respective heads, a mixer coupled to the outputs of said plurality of gate circuits for combining said outputs, a demodulator for demodulating the output signal from said mixer, and a first vertical sync signal separator for separating a vertical sync signal from the demodulated signal produced by said demodulator; and wherein said second means comprising said motor control means includes a second vertical sync signal separator for separating a vertical sync signal from the input video signal to be recorded, and a ramp wave generator coupled to said second vertical sync signal separator for producing a ramp wave signal;

the output of said first vertical sync signal separator corresponding to said first signal and the output of said ramp wave generator corresponding to said second signal being coupled to said phase comparator means.

4. The magnetic recording system defined by claim 3, wherein a variable gain circuit is interposed between said one rotary magnetic head and the gate circuit coupled thereto, said variable gain circuit including a variable gain amplifier providing a gain of unity when a reproduced signal is being transmitted from said rotary magnetic head to said gate circuit and a gain less than unity when a recording signal is being transmitted from said buffer amplifier to said rotary magnetic head.

5. The magnetic recording system defined by claim 1, wherein said rotary magnetic head drum assembly has three rotary heads, and wherein said motor control means drives said motor means at a speed $$V_M = (3n+1)V_T,$$

where $V_T$ is the speed of the magnetic tape and $n$ is a positive integer, whereby the track portion of each video signal field recorded on said magnetic tape is made continuous to that of the preceeding video signal field.

6. In a magnetic recording system for recording an input video signal, said system including a rotary magnetic head drum assembly having a drum and a plurality of rotary magnetic heads spaced apart at a predetermined angular interval; motor means for rotating said magnetic heads; and a magnetic tape drive means for driving a magnetic tape wound around the outer periphery of said drum in a predetermined direction at a predetermined speed, said magnetic tape being wound around the outer periphery of said drum in the shape of the character $\Omega$, the improvement comprising:

video signal recording circuit means for receiving said input video signal and coupling said video signal to one of said rotary magnetic heads, a video signal corresponding to said input video signal being recorded on said magnetic tape field by field in the lengthwise direction thereof;

a first circuit coupled to said plurality of rotary magnetic heads for producing a first signal corresponding to a video signal previously recorded on said magnetic tape;

a second circuit for extracting a vertical sync signal from said input video signal and producing a second signal;

a third circuit for generating a third signal corresponding to the rotational phase of said rotary magnetic heads;

a fourth circuit for obtaining a fourth signal corresponding to the rotational phase of said rotary magnetic heads by selecting either one of said first and third signals;

a fifth circuit coupled to said motor means for controlling the rotation of said motor by comparing the phases of said second and fourth signals; and a sixth circuit coupled to said fourth circuit for controlling said fourth circuit to select said third signal in the absence of said first signal and select said first signal in the presence of said first signal.

7. The magnetic recording system defined by claim 6, wherein said third circuit comprises a plurality of stationary magnetic heads spaced apart at a predetermined angular interval, a permanent magnet rotatable in unison with said rotary magnetic heads in predetermined relation to said stationary magnetic heads, and a signal processing circuit for receiving signals obtained from said respective stationary magnetic heads and combining the amplified signals.

8. The magnetic recording system defined by claim 6, wherein said first circuit includes a plurality of gate circuits coupled to said plurality of rotary magnetic heads for gating reproduced signals from respective heads through respective rotary transformers, a mixer coupled to the outputs of said plurality of gate circuits for combining said outputs, a demodulator for demodulating the output signal from said mixer, and a vertical sync signal separator for separating a vertical sync signal from the demodulated signal produced by said demodulator.

9. The magnetic recording system defined by claim 6, wherein said first circuit includes
 a plurality of shaping circuits for shaping signals reproduced from said respective rotary magnetic heads; and
 a mixer for combining the outputs of said shaping circuits to produce said first signal.

10. The magnetic recording system defined by claim 6, wherein said video signal recording circuit means includes
 a gate circuit for extracting one field of video signal to be recorded from said input video signal;
 a phase comparator for comparing the phase of a signal obtained from said third circuit corresponding to the rotational phase of one of said rotary magnetic heads with that of the fourth signal obtained from said fourth circuit; and
 circuit means to control said gate circuit with an output signal from said phase comparator.

11. The magnetic recording system defined by claim 10, which further comprises
 means for recording and/or reproducing audio signals; and
 delay means for adjusting the relation of the positions of recording of video and audio signals on said magnetic tape by varying the timing of recording of the video signal of one field in the rotary magnetic head drum assembly, said delay means delaying the signal obtained from said third circuit corresponding to the rotational phase of said one of said rotary magnetic heads before said signal is applied to said phase comparator, the delay time of said delay circuit being variable.

* * * * *